(No Model.)
H. S. ALBRECHT.
SELF OILING JOURNAL BEARING.
No. 537,172. Patented Apr. 9, 1895.
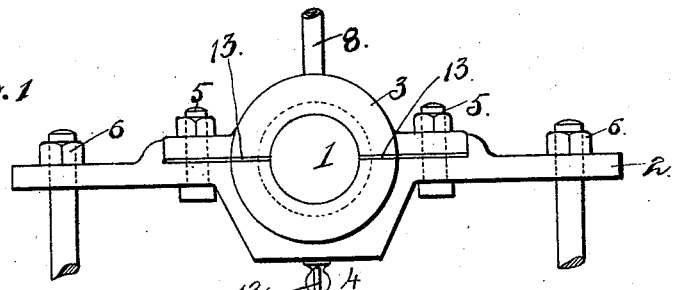
Fig. 1
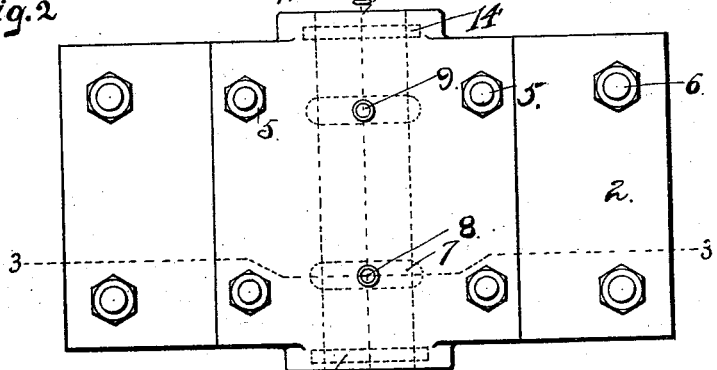
Fig. 2
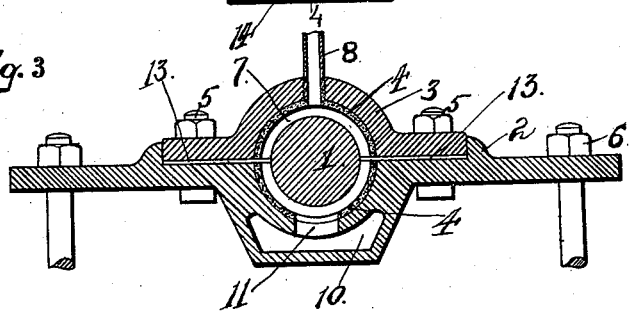
Fig. 3
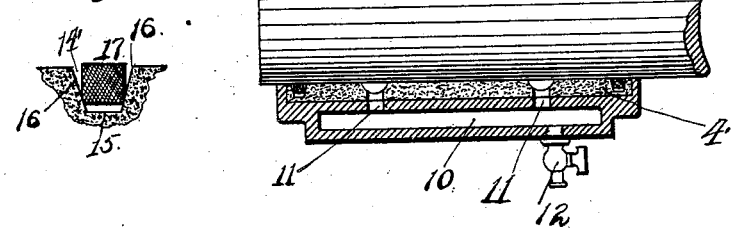
Fig. 4
Fig. 5
Witnesses
Jos. Froehlich.
A. A. Blankenmeister.
Inventor
Herman S. Albrecht.
By his Attorneys
Higdon and Higdon
THE NORRIS PETERS CO., PHOTO-LITHO., WASHINGTON, D. C.

UNITED STATES PATENT OFFICE.

HERMAN S. ALBRECHT, OF ST. LOUIS, MISSOURI.

SELF-OILING JOURNAL-BEARING.

SPECIFICATION forming part of Letters Patent No. 537,172, dated April 9, 1895.

Application filed May 28, 1894. Serial No. 512,618. (No model.)

*To all whom it may concern:*

Be it known that I, HERMAN S. ALBRECHT, of the city of St. Louis, State of Missouri, have invented certain new and useful Improvements in Self-Oiling Journal-Bearings, of which the following is a full, clear, and exact description, reference being had to the accompanying drawings, forming a part hereof.

My invention relates to an improved "self oiling journal bearing;" and consists in the novel construction, combination and arrangement of parts hereinafter specified and designated in the claims.

The object of my invention is to provide an improved bearing especially adapted for heavy journals, and which may be quickly cleaned by blowing steam through it, and which will effectively and continuously lubricate the journal and prevent same from becoming injuriously heated during use.

In the drawings: Figure 1 is a side elevation of my improved bearing with parts broken away. Fig. 2 is a plan view of same. Fig. 3 is a longitudinal section on line 3—3 of Fig. 2. Fig. 4 is a cross section on line 4—4 of Fig. 2. Fig. 5 is an enlarged detail section, taken across one of the packing grooves at the end of the bearing.

1 indicates an ordinary shaft or journal, and 2 the lower half or base of my improved bearing.

3 indicates the cap of the bearing, and both base and cap are provided with an annular recess in the usual manner and this recess is filled with a body of Babbitt metal 4, which forms the wearing surface of the bearing.

5 indicates the usual bolts for securing the cap upon the base, and 6 the bolts for securing the base in position.

Formed in the inner face of the Babbitt metal 4 a distance apart is a series of two or more annular grooves 7, which are located a distance from the ends of the bearing.

8 indicates an ordinary pipe threaded into an opening in the top of the cap 3 and its body of Babbitt metal, and communicating at its lower end with one of the annular grooves 7, whereby oil may be supplied to the bearing.

9 indicates another ordinary pipe threaded into an opening in the top of the cap 3 and its body of Babbitt metal, and communicating at its lower end with another one of the annular grooves 7, so that steam under pressure may be supplied to the bearing. This arrangement can be reversed if desired, that is, either pipe can be used for oil or steam.

Formed in the base 2 and extending directly beneath the shaft 1 and longitudinally thereof is a chamber 10, and formed in the roof of this chamber and in the adjacent body of Babbitt metal 4 is a series of two or more vertical passages 11 which are preferably oblong in plan view and located transversely of said shaft. The upper ends of these vertical passages communicate one with one of the annular grooves 7, and the other with the other annular groove 7, and the lower ends of both of said vertical passages communicate with said chamber 10.

12 indicates a common stop-cock applied to the bottom of said chamber, for the purpose of permitting the discharge of steam, oil, water and sediment from said chamber when required.

13 indicates the common "liners" applied between the cap 3 and the base 2 in the usual manner, to permit adjustment for wear.

Formed in the Babbitt metal body 4 closely adjacent each end of the bearing is an annular groove or recess 14, the bottom 15 of which is parallel with the surface of the shaft 1, but the opposite sides 16 of which converge toward said bottom, or in other words are tapered or inclined. The grooves 14 have their open sides directly adjacent said shaft. In the grooves 14 are placed packings 17, which are preferably of pliable fibrous material, such as a combination of rubber and textile material.

The operation is as follows: Oil or other lubricant is supplied to one of the pipes 8 or 9 and passes to the shaft 1 and thoroughly lubricates the same, while the excess gravitates into the chamber 10, from whence it may be withdrawn from time to time by means of the cock 12. The packings 17 by contact with the shaft 1 are forced into the grooves 14 and engage the inclined or tapered opposite walls of said grooves and form a tight joint therewith and with said shaft, and effectually prevent any passage of oil, and also prevent entrance of dust or grit.

By introducing steam under pressure, all gum and thickened accumulations may be quickly discharged from the bearing and from the chamber 10, thereby effectually cleansing these parts.

What I claim is—

1. The improved self-oiling bearing, comprising the base 2 and cap 3 having the usual annular recess upon their inner surfaces, a separate body of metal 4 located in said recess to encircle the shaft, said body of metal having an annular groove 7 formed in it at a distance from the ends of the bearing, a pipe communicating with said annular groove, the base 2 beneath said body of metal having formed in it a chamber 10, said chamber and said annular groove being placed in communication by a restricted vertical passage 11, a valved outlet for said chamber, said body of metal provided with an annular groove 14 having converging opposite walls one adjacent each end of said bearing, and packings located in said grooves 14, substantially as herein specified.

2. The improved self-oiling bearing, comprising the base 2, cap 3, a body of metal 4 connected to said base and cap to embrace the shaft, said body of metal having a series of annular grooves 7 formed in it a distance from the ends of the bearing but separated from each other, a pipe 8 threaded into the top of said cap and communicating with one of said annular grooves, another pipe 9 threaded into the top of said cap and communicating with another one of said annular grooves, said base having a chamber 10 formed in it beneath said body of metal and extending therein in a direction longitudinal of the shaft, a valved outlet for said chamber, the roof of said chamber having a series of vertical passages 11 which are elongated in plan view and communicate with said annular grooves, said body of metal having an additional annular groove 14 formed in itself closely adjacent each end of the bearing, and suitable packings located in the annular grooves last mentioned, substantially as herein specified.

In testimony whereof I affix my signature in presence of two witnesses.

HERMAN S. ALBRECHT.

Witnesses:
E. E. LONGAN,
JNO. C. HIGDON.